(12) United States Patent
Shimizu

(10) Patent No.: US 7,180,557 B2
(45) Date of Patent: Feb. 20, 2007

(54) LIQUID-CRYSTAL PROJECTOR

(75) Inventor: Hitoshi Shimizu, Saitama (JP)

(73) Assignee: Fujinon Corporation, Saitama (JP)

( * ) Notice: Subject to any disclaimer, the term of this patent is extended or adjusted under 35 U.S.C. 154(b) by 196 days.

(21) Appl. No.: 10/874,200

(22) Filed: Jun. 24, 2004

(65) Prior Publication Data

US 2005/0001942 A1 Jan. 6, 2005

(30) Foreign Application Priority Data

Jul. 4, 2003 (JP) .............................. 2003-192331

(51) Int. Cl.
*G02F 1/1335* (2006.01)
(52) U.S. Cl. ................... 349/5; 349/9; 349/58; 353/85; 353/100; 353/101; 353/119
(58) Field of Classification Search .................... 349/5, 349/9, 58; 353/85, 119, 100, 101
See application file for complete search history.

(56) References Cited

U.S. PATENT DOCUMENTS

| 6,793,346 B2* | 9/2004 | Nakano et al. ............. 353/119 |
| 6,935,753 B2* | 8/2005 | Takezawa et al. .......... 353/119 |
| 2003/0108741 A1* | 6/2003 | Niino et al. ................ 428/375 |
| 2004/0189958 A1* | 9/2004 | Lee ............................ 353/101 |

FOREIGN PATENT DOCUMENTS

| JP | 3257067 | 12/2001 |
| JP | 3339504 | 8/2002 |

* cited by examiner

*Primary Examiner*—David Nelms
*Assistant Examiner*—Thanh-Nhan Phan Nguyen
(74) *Attorney, Agent, or Firm*—Arnold International; Bruce Y. Arnold

(57) ABSTRACT

A projection unit comprises a light source unit and an image forming unit. The light source unit includes a light source section and an illuminating optical system which condenses the illuminating light and forms the illuminating light to approximately parallel rays. The image forming unit includes an image forming optical system which decomposes the illuminating light into three-primary-colors lights, radiates the three-primary-colors lights to liquid-crystal displays corresponding to each color, and composes the three-primary-colors image lights into full-color image light, and a projection lens which projects the full-color image light to a screen. The light source unit is contained in a light source unit case which is formed with a material excellent in heat resistance. The image forming unit is contained in an image forming unit case which is formed with a material which is not excellent in heat resistance. The light source unit case is attached to the image forming unit case in detachable manner. When modifying the light source section, the light source unit and the light source unit case are modified, but the image forming unit and the image forming unit case are not modified.

2 Claims, 5 Drawing Sheets

LIQUID-CRYSTAL PROJECTOR

BACKGROUND OF THE INVENTION

1. Field of the Invention

The present invention relates to a liquid-crystal projector. More particularly, the present invention relates to a liquid-crystal projector where an image projected on rear side of a screen is monitored from front side of the screen.

2. Description Related to the Prior Art

As disclosed in Japanese Patent No. 3257067 and Japanese Patent No. 3339504, the liquid-crystal projector is well known as an image displaying apparatus, which displays the images on the screen by projecting light modulated by liquid-crystal displays to the screen. As types of liquid-crystal projector, there are a front type in which the images are projected from the front side of the screen, and a rear type in which the images are projected from the rear side of the screen. In addition, the liquid-crystal projectors are categorized into a transmissive type and a reflective type, according to type of the liquid-crystal display used in the liquid-crystal projector.

Illuminating light from a light source illuminates the liquid-crystal displays after condensed and formed to approximately parallel rays by an illuminating optical system. If an illuminating area is too large to a size of the liquid-crystal displays, usability of the illuminating light becomes down. In addition, if the illuminating area is too small to the size of the liquid-crystal displays, quality of the image displayed on the screen becomes down.

In an image forming optical system, for example, three liquid-crystal displays corresponding to blue, green, and red color light are provided. The illuminating light radiated from the illuminating optical system is decomposed into three-primary-colors channels including blue, green, and red color light that illuminates the corresponding liquid-crystal display. And three-primary-colors lights, modulated by the corresponding liquid-crystal display by each color channel, are projected on the screen by a projection lens after being composed or synthesized by for example a composite prism.

In the liquid-crystal projector, for example an ultra-high pressure mercury lamp or a metal halide lamp is used as the light source. Performance of the liquid-crystal projector largely depends on performance of the light source. If a powerful light source is used, it will become possible to project images to a bigger screen, and to project clear images even if it is a bright place. However, if the powerful light source is used, manufacture cost will increase and the price of a product will become high. Therefore, it is necessary to choose the light source used for the liquid-crystal projector according to a user's needs.

Since the user's needs are various, the user often requests using a specific light source. In this case, a change of the light source is made. According to a new light source, the illuminating optical system must also be modified so that the illuminating light from the new light source may illuminate the suitable range that is slightly larger to the size of the liquid-crystal display.

However, in the conventional liquid-crystal projector, the illuminating optical system and the image forming optical system were unitized and contained in a same case. Therefore, in case of modification of the illuminating optical system accompanying change of the light source, since the case must also be changed, there is a problem that modification of the illuminating optical system accompanying change of the light source cannot be made easily.

Moreover, since the light source emits high heat, it is necessary to contain the illuminating optical system, arranged near the light source, in a case excellent in heat resistance. On the other hand, a case, which contains the image forming optical system that is arranged away from the light source, does not need great heat resistance. However, in case of the illuminating optical system and the image forming optical system are unitized, the image forming optical system is also contained in the case formed with the material excellent in heat resistance, according to the need of the illuminating optical system. Since the material excellent in heat resistance is expensive, there is the problem that the manufacture cost of the liquid-crystal projector becomes high.

SUMMARY OF THE INVENTION

A main object of the present invention is to provide a liquid-crystal projector in which modification of an illuminating optical system accompanying change of a light source can be made easily.

Another object of the present invention is to decrease a manufacture cost of the liquid-crystal projector.

In order to achieve the object and the other object, the liquid-crystal projector of the present invention comprises a light source unit case which contains a light source unit, and a image forming unit case which contains a image forming unit. The light source unit case is attached to the image forming unit case in detachable manner, for modification of the illuminating optical system.

The light source unit includes a light source section and the illuminating optical system. The image forming unit includes the image forming optical system having three liquid-crystal displays, and a projection lens. The light source section emits illuminating light, and the illuminating optical system condenses the illuminating light and forms the illuminating light to approximately parallel rays. The image forming optical system decomposes the illuminating light into three-primary-colors lights, radiates the three-primary-colors lights to the liquid-crystal displays corresponding to each color, and composes image light from the each liquid-crystal display in three-primary-colors into full-color image light. The projection lens projects the full-color image light to a screen.

In a preferable embodiment of the present invention, the light source unit case and the image forming unit case respectively include an opening and an attachment portion provided near the opening. When the attachment portion of the light source unit case and the attachment portion of the image forming unit case are combined, the opening of the light source unit case and the opening of the image forming unit case are faced to each other. Moreover, a material which forms the light source unit case and a material which forms the image forming unit case are different, and the material which forms the light source unit case has higher heat resistance than the material which forms the image forming unit case.

In the liquid-crystal projector of the present invention, the light source unit case contains the light source unit which includes the light source section and the illuminating optical system, the image forming unit case contains the image forming unit which includes the image forming optical system and the projection lens, and the light source unit case is attached to the image forming unit case in detachable manner. Therefore, modification of the illuminating optical system accompanying change of the light source can be made easily. In addition, since the material which forms the light source unit case has higher heat resistance than the material which forms the image forming unit case, the manufacture cost of the liquid-crystal projector can be decreased.

BRIEF DESCRIPTION OF THE DRAWINGS

The above objects and advantages of the present invention will become easily understood by one of ordinary skill in the art when the following detailed description would be read in connection with the accompanying drawings.

PREFERRED EMBODIMENTS OF THE INVENTION

Figure 1:
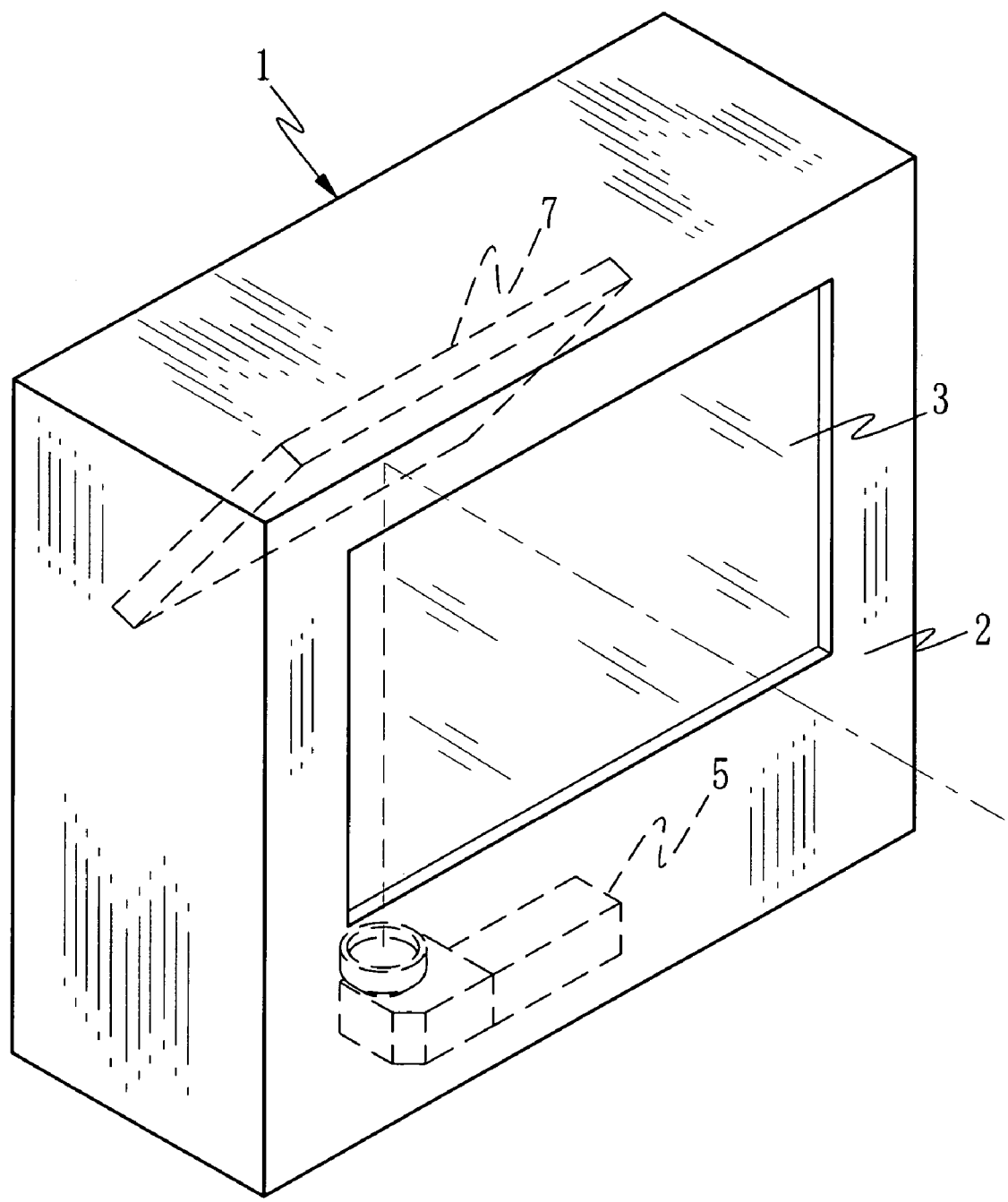
FIG. 1 is a perspective view of a liquid-crystal projector.

In FIG. 1, a screen 3 of diffuse transmission type is provided on front of a case 2. An image projected on rear side of the screen 3 is monitored from front side of the screen 3. A projection unit 5 is contained in the case 2. The image projected from the projection unit 5 is reflected by a mirror 7 and focused on rear side of the screen 3. A liquid-crystal projector 1 provides a well known circuit unit including a tuner circuit and a circuit for video signal and voice signal reproduction, etc., inside the case 2. By displaying reproduction images of the video signal on liquid-crystal displays provided in the projection unit 5, the liquid-crystal projector 1 can be used as a television having a big screen.

Figure 2:
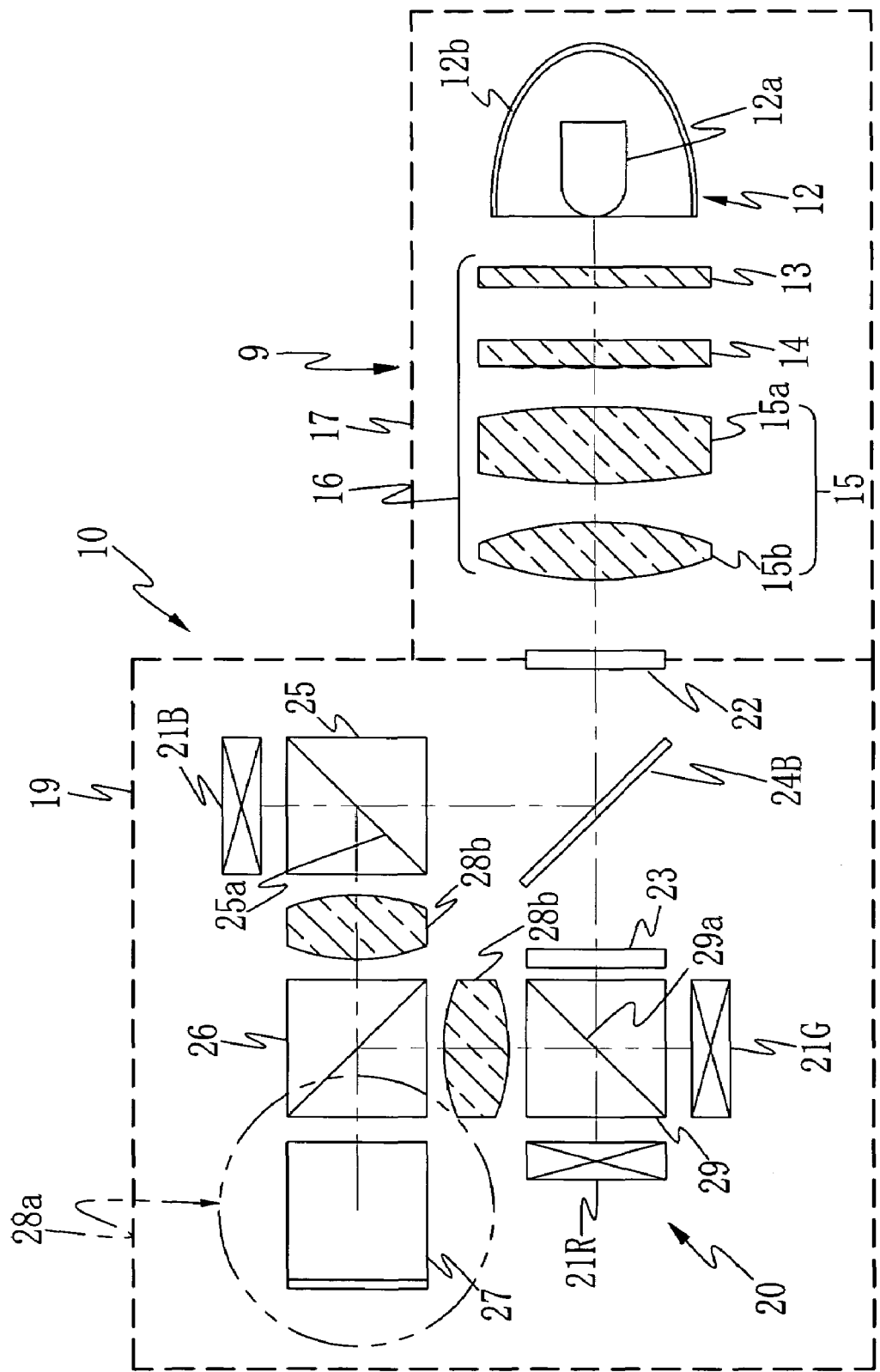
FIG. 2 is a schematic view illustrating optical structure of a projection unit of the liquid-crystal projector.

In FIG. 2, a light source unit 9 and an image forming unit 10 are provided in the projection unit 5. Described later in detail, the light source unit 9 is contained in a light source unit case 17, and an image forming unit 10 is contained in the image forming unit case 19, respectively.

In the light source unit 9, a light source section 12 including an ultra-high pressure mercury lamp 12a and a reflector 12b, and an illuminating optical system 16 which condenses illuminating light and forms the illuminating light to approximately parallel rays to illuminate the image forming unit 10, are provided. The illuminating optical system 16 comprises a filter 13, a fly-eye lens 14, and a condenser lens 15.

The illuminating light of white from the light source section 12 transmits the filter 13 which cuts ultraviolet rays and infrared rays, and enters to the fly-eye lens 14. Reflector 12b reflects the illuminating light emitted from the lamp 12a, for which the illuminating light enters to the fly-eye lens 14 efficiently. The fly-eye lens 14 has plural lenses arranged in a field perpendicular to an illuminating optical axis, for making entered light uniform to exit the uniformed light. The condenser lens 15 has two lenses 15a and 15b. The first lens 15a arranged at the side of the light source section 12 condenses the illuminating light, to adjust an illuminating range. The second lens 15b arranged at the side of the image forming unit 10 forms the illuminating light to the approximately parallel rays. The white light which is uniformed and adjusted the illuminating range advances to the image forming unit 10.

The image forming unit 10 comprises an image forming optical system 20 and a projection lens 28. The image forming optical system 20 includes three reflective liquid-crystal displays 21R, 21G, 21B, a polarizer 22, a specific-wavelength converting plate 23, a dichroic mirror 24B, a polarizing prism 25, a beam splitter 29, a composite prism 26, and a mirror 27. The projection lens 28 includes a front lens group 28a and a rear lens group 28b.

After the illuminating light from the light source unit 9 is converted into S-polarized light by the polarizer 22, it is decomposed into two illuminating light beams by the dichroic mirror 24B, which reflects only blue light and transmits green light and red light. The reflected blue light is entered to the polarizing prism 25 which has a reflecting surface 25a. The reflecting surface 25a of the polarizing prism 25 has a characteristic of reflecting P-polarized light and transmitting S-polarized light. The blue light is transmitted from the reflecting surface 25a, and entered to the liquid-crystal display 21B. And when reflecting by the reflective liquid-crystal display 21B, the blue light is modulated into blue image light, and is converted to P-polarized light. The P-polarized blue image light enters the composite prism 26, after being reflected by the reflecting surface 25a and passing through the rear lens group 28b of the projection lens 28.

In the reflective liquid-crystal display, it fills up with liquid-crystal between a transparent glass and a poly-silicon substrate, as known. A reflecting surface of aluminum film is formed on inside surface of the poly-silicon substrate. The light which entered from the transparent glass passes along the liquid-crystal, and reaches the reflecting surface. The light reflected on the reflecting surface passes along the liquid-crystal, and exits from the transparent glass.

On the other hand, the green light and the red light transmitted from the dichroic mirror 24B are entered to the specific-wavelength converting plate 23. Only the green light is converted to P-polarized light by the specific-wavelength converting plate 23. P-polarized green light and S-polarized red light are entered to the beam splitter 29 having a reflecting surface 29a. The reflecting surface 29a of the beam splitter 29 has a characteristic of reflecting P-polarized light and transmitting S-polarized light. P-polarized green light is reflected by the reflecting surface 29a, and enters to the liquid-crystal display 21G. And when reflecting by the reflective liquid-crystal display 21G, the green light is modulated into green image light, and is converted to S-polarized light. S-polarized green image light transmits the reflecting surface 29a. On the other hand, S-polarized red light is transmitted from the reflecting surface 29a, and enters to the liquid-crystal display 21R. And when reflecting by the reflective liquid-crystal display 21R, the red light is modulated into red image light, and is converted to P-polarized light. P-polarized red image light is reflected by the reflecting surface 29a. Accordingly, the green image light and the red image light are composed, and enter the composite prism 26 after passing through the rear lens group 28b of the projection lens 28.

The composite prism 26 has a characteristic of transmitting only the blue light and reflecting the green light and the red light, and is arranged so that a center of the prism is on a position that is same optical distance away from each liquid-crystal display 21R, 21G, 21B. The blue image light from the liquid-crystal display 21B transmits the composite prism 26, and the red image light from the liquid-crystal display 21R and the green image light from the liquid-crystal display 21G are reflected by the composite prism 26. Accordingly, the blue image light and the green and red image light are composed to full-color image light. The full-color image light is reflected by the mirror 27, and enters to the front lens group 28a of the projection lens. The projection lens 28 is adjusted so that an object side focal plane corresponds to the reflecting surface of the liquid-crystal displays 21R, 21G, 21B, and an image side focal plane corresponds to the screen 3. According to that, full-color image can be focused on the screen 3.

Figure 3A:
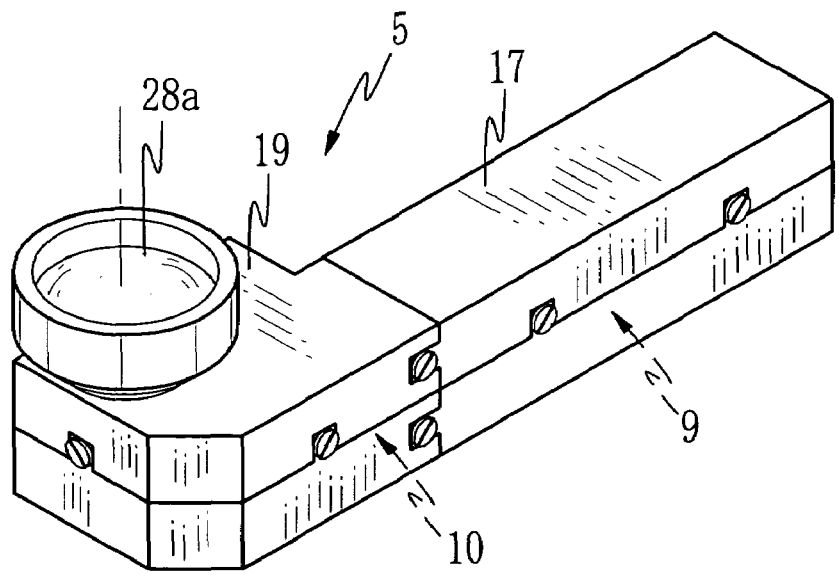
FIG. 3 is a perspective view of the projection unit.
Figure 3B:
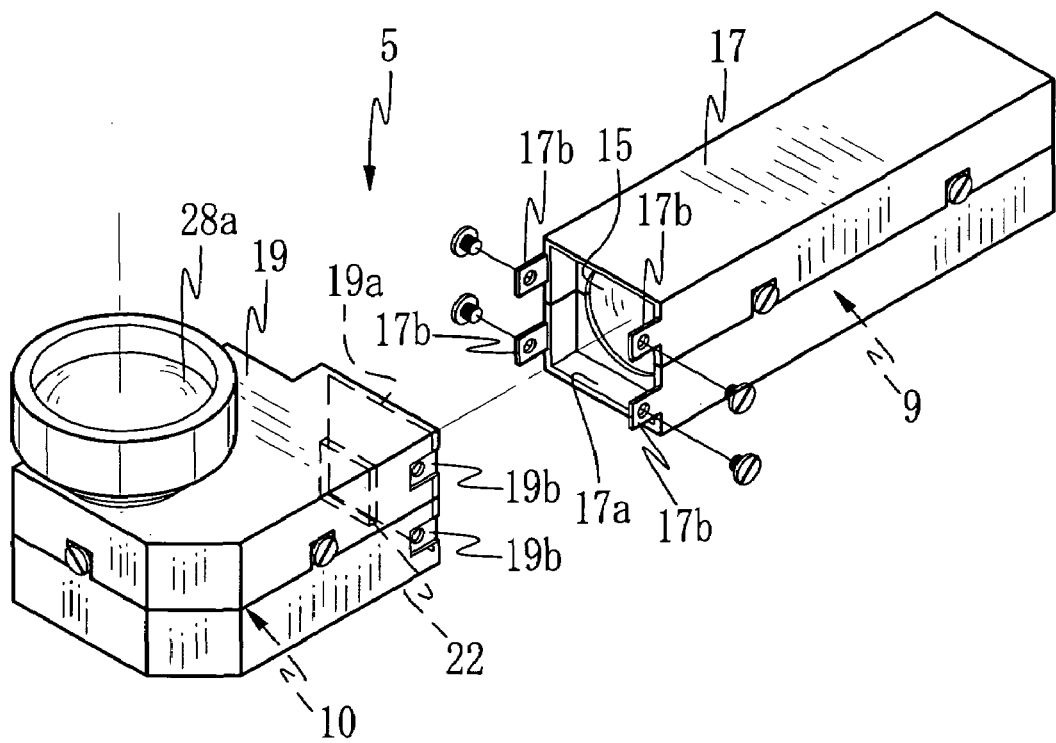

As shown in FIG. 3A, The projection unit 5 is constituted by attaching the light source unit case 17 which contains the light source unit 9 to the image forming unit case 19 which contains the image forming unit 10. As shown in FIG. 3B, the light source unit case 17 provides an opening 17a which exposes the condenser lens 15, and an attachment portion 17b is formed near the opening 17a. In the same way, the image forming unit case 19 provides an opening 19a which exposes the polarizer 22, and an attachment portion 19b is formed near the opening 19a.

The light source unit case 17 is attached to the image forming unit case 19 by combining the attachment portion 17b with the attachment portion 19b. By this, the opening 17a and the opening 19a are matched and the condenser lens 15 and the polarizer 22 are faced to each other. The light source unit case 17, which is attached to the image forming unit case 19, is fixed such that the attachment portion 17b is screwed to the attachment portion 19b.

Figure 4:
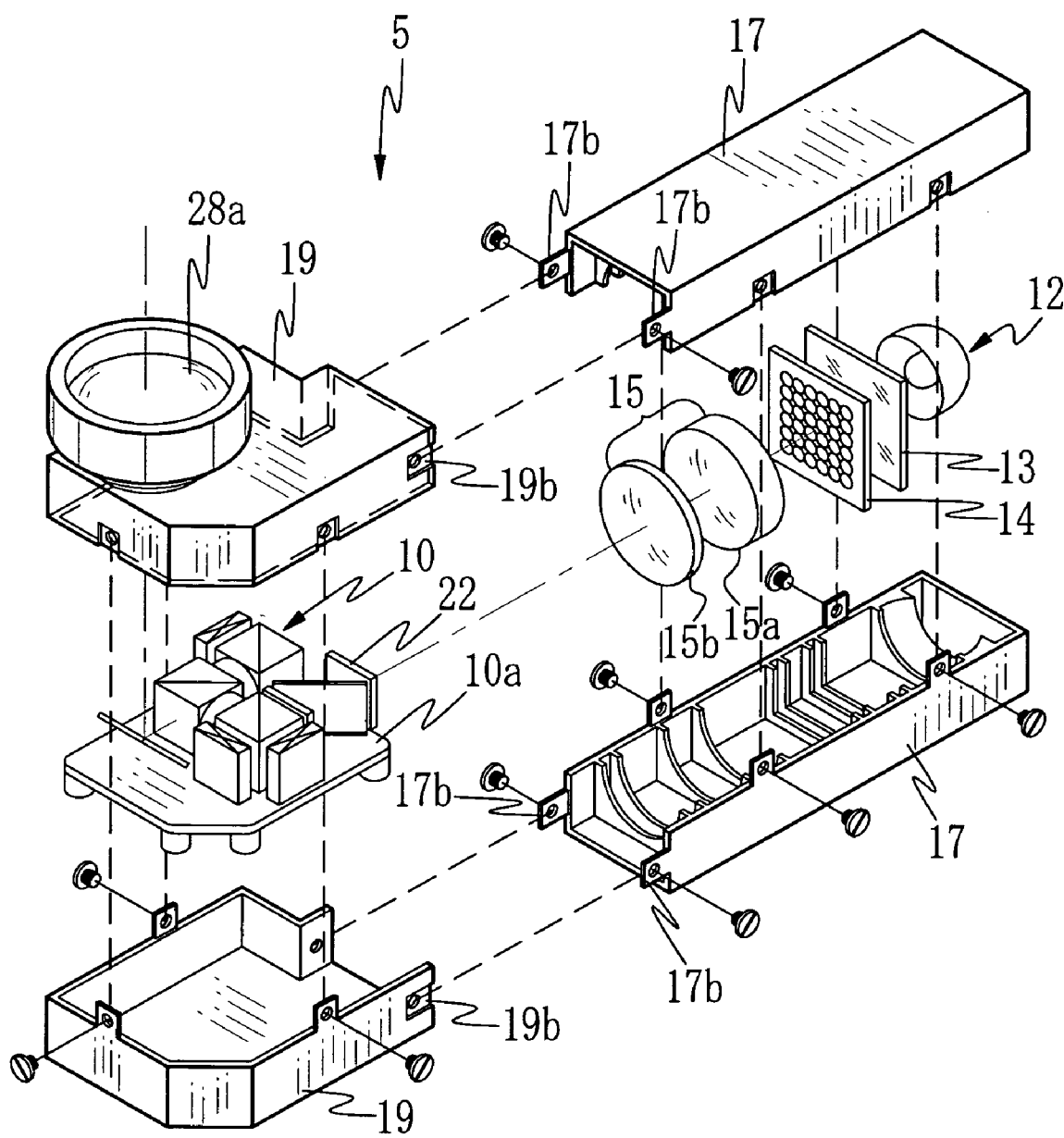
FIG. 4 is an exploded view of the projection unit.

As shown in FIG. 4, the light source unit case 17 and the image forming unit case 19 are respectively composed of an upper case and a lower case, such that the unit cases are divided into upper and lower parts. And the upper cases and the lower cases are combined and screwed such that optical components are sandwiched between the upper cases and the lower cases. The image forming unit case 19 holds the image forming unit 10 fixed on a base 10a. Arrangement positions of each components of the image forming unit 10 are determined such that the polarizer 22 is arranged at approximately center of the opening 19a. Arrangement positions of each components of the light source unit 9 are determined such that the uniformed illuminating light illuminates overall the polarizer 22, and these components are held by the light source unit case 17.

Accordingly, when the light source section 12 emits the illuminating light in the light source unit case 17 which is attached to the image forming unit case 19, overall the polarizer 22 is illuminated and the illuminating light enters to the image forming unit 10. The front lens group 28a of the projection lens 28 is exposed from upper surface of the image forming unit case 19. Accordingly, when the light source section 12 emits the illuminating light, as described above, the image light is formed by the image forming unit 10, and the image is projected on the screen 3.

Since around the light source section 12 becomes high temperature when the light source section 12 emits the illuminating light, the light source unit case 17 is formed with a material which is excellent in heat resistance, for example BMC. And the image forming unit case 19 formed with a low-cost material for example polycarbonate, because the image forming unit case 19 being apart from the light source section 12 is hard to be influenced from heat.

Hereinafter, operation of the present invention is described. The light source section 12 is contained in the light source unit case 17 with the illuminating optical system 16, and the light source unit case 17 is attached to the image forming unit case 19. By the way, the kind of lamp is often changed according to a request of a user.

Figure 5:
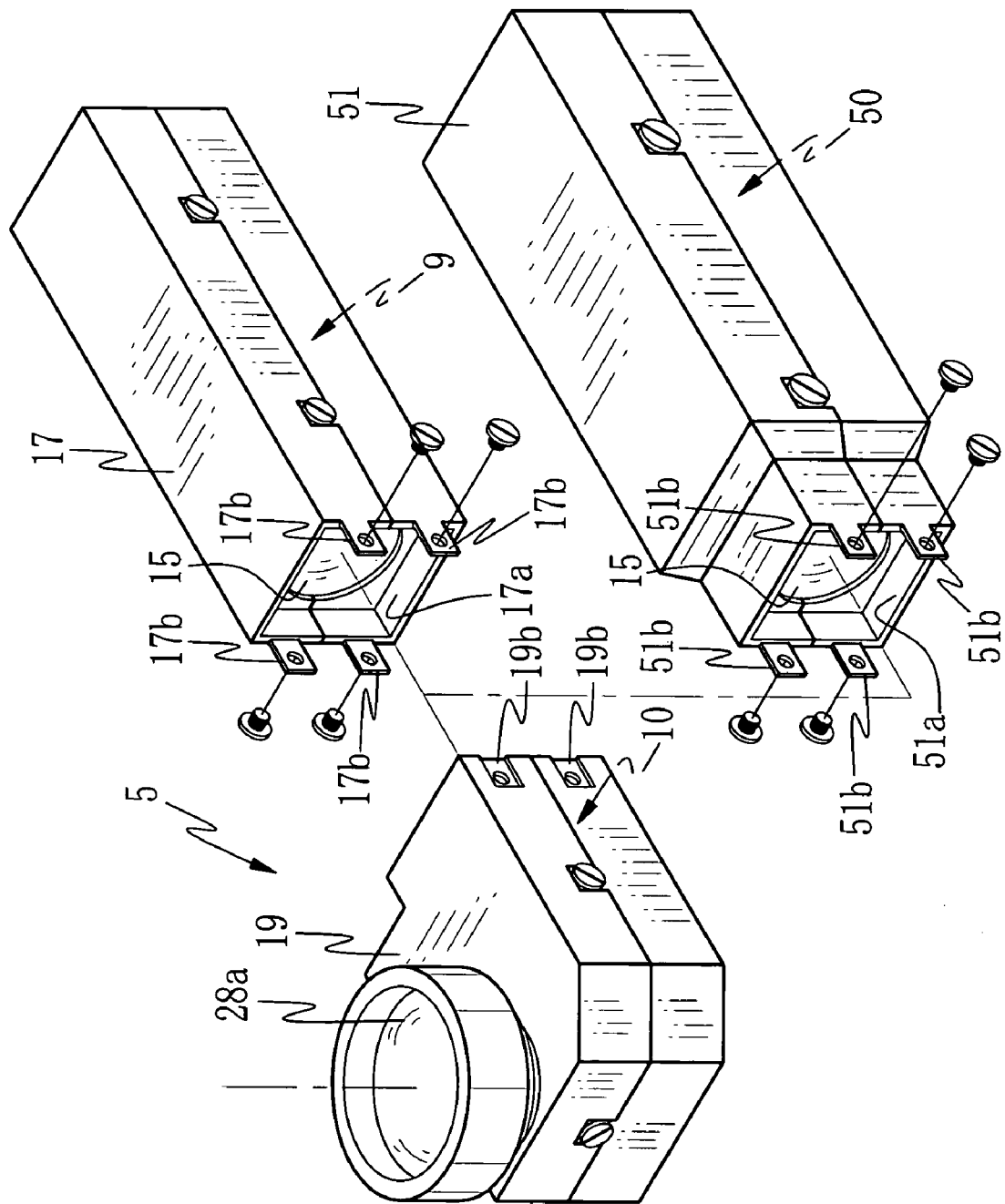
FIG. 5 is an explanatory view illustrating modification of a light source unit of the projection unit.

As shown in FIG. 5, in case of modification of the light source section 12, the light source unit 9 and the light source unit case 17 are modified. The modification is made by, modification of the illuminating optical system 16 accompanying the modification of the light source section 12. The illuminating optical system 16 is modified such that the uniformed illuminating light illuminates overall the polarizer 22 exposed from the image forming unit case 19. New light source unit 50 is contained in new light source unit case 51, which provides an opening 51a and an attachment portion 51b, as same as the opening 17a and the attachment portion 17b of the light source unit case 17. The new light source unit case 51 is attached to the image forming unit case 19.

As described above, the light source unit case is independent from the image forming unit case. Therefore, the light source unit case, which contains the light source according to the request of the user and the illuminating optical system being suitable for the light source, can be attached to the image forming unit case. Accordingly, as compared with what contains the light source section, the illuminating optical system, and the image forming optical system in the same case, the modification of the light source section can be made easily. In addition, there is a merit that the image forming unit case can be used in common to various light source unit cases.

Moreover, the light source section 12 and the illuminating optical system 16 which are heated are unitized and contained in the light source unit case 17 which is formed with the material excellent in heat resistance. On the other hand, the image forming optical system 20, which is hard to be influenced from heat because of being apart from the light source section, is contained in the image forming unit case 19 which is formed with the low-cost material. Therefore, the manufacture cost of the liquid-crystal projector can be held down compared with forming one case with the heat-resistant material.

Although the reflective liquid-crystal display is used for the projection unit of the above embodiment, a transmissive liquid-crystal display may be used for it. In addition, although the projection unit of the above embodiment is for a rear type liquid-crystal projector in which the images are projected from the rear side of the screen, the present invention can be applied to a projection unit for a front type liquid-crystal projector in which the images are projected from the front side of the screen.

Various changes and modifications are possible in the present invention and may be understood to be within the present invention.

What is claimed is:

1. A liquid-crystal projector for displaying an image on a screen, said liquid-crystal projector comprising:
  a light source unit including a light source section and an illuminating optical system, said light source section emitting illuminating light, and said illuminating optical system condensing the illuminating light and forming the illuminating light to approximately parallel rays;
  an image forming unit including an image forming optical system having first to third liquid-crystal displays and a projection lens, said image forming optical system decomposing the illuminating light into three-primary-colors lights, radiating the three-primary-colors lights to said liquid-crystal display corresponding to each color, and composing three-primary-colors image lights from said each liquid-crystal display into full-color image light, and said projection lens projecting the full-color image light to said screen;
  a light source unit case which contains said light source unit; and
  an image forming unit case which contains said image forming unit, said light source unit case being attached to said image forming unit case in detachable manner, wherein
said light source unit case and said image forming unit case include respectively an opening and an attachment portion being formed near said opening, when combining said attachment portion of said light source unit case with said attachment portion of said image forming unit case, said opening of said light source unit case and the opening of said image forming unit case are faced to each other; and a material which forms said light source unit case and a material which forms said image forming unit case are different, said material which forms said light source unit case having higher heat resistance than said material which forms said image forming unit case.

2. A liquid-crystal projector according to claim 1, wherein said material which forms said light source unit case is BMC, and said material which forms said image forming unit case is polycarbonate.

* * * * *